(12) United States Patent
Wild et al.

(10) Patent No.: US 8,988,197 B2
(45) Date of Patent: Mar. 24, 2015

(54) RFID REPEATER FOR RANGE EXTENSION IN MODULATED BACKSCATTER SYSTEMS

(75) Inventors: Ben J. Wild, Sunnyvale, CA (US);
Upamanyu Madhow, Santa Barbara, CA (US); Kannan Ramchandran, El Cerrito, CA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 904 days.

(21) Appl. No.: 12/548,993

(22) Filed: Aug. 27, 2009

(65) Prior Publication Data

US 2010/0156610 A1 Jun. 24, 2010

Related U.S. Application Data

(60) Provisional application No. 61/190,791, filed on Sep. 3, 2008.

(51) Int. Cl.
| | |
|---|---|
| *G08B 13/14* | (2006.01) |
| *G08B 13/181* | (2006.01) |
| *G06K 13/06* | (2006.01) |
| *H04B 3/36* | (2006.01) |
| *G06K 7/00* | (2006.01) |

(52) U.S. Cl.
CPC .................................. *G06K 7/0008* (2013.01)
USPC ..... 340/10.4; 340/10.1; 340/10.5; 340/572.1; 340/572.4; 340/5.92

(58) Field of Classification Search
CPC .............................. G08B 13/14; G08B 13/181
USPC .............. 340/10.34, 10.1–10.5, 572.1, 572.4, 340/5.92, 573.3; 235/383, 385, 492; 342/42; 455/7, 41.2
See application file for complete search history.

(56) References Cited

U.S. PATENT DOCUMENTS

| | | | |
|---|---|---|---|
| 4,333,072 A | | 6/1982 | Beigel |
| 5,959,568 A | * | 9/1999 | Woolley ........................ 342/42 |
| 6,037,898 A | | 3/2000 | Parish et al. |
| 6,127,928 A | * | 10/2000 | Issacman et al. .......... 340/572.1 |
| 6,172,609 B1 | | 1/2001 | Lu et al. |

(Continued)

FOREIGN PATENT DOCUMENTS

WO 2005060700 A3 7/2005

OTHER PUBLICATIONS

International Search Report Regarding International Application No. PCT/US2009/055624.

*Primary Examiner* — Nam V Nguyen
(74) *Attorney, Agent, or Firm* — Richard A. Howe, II

(57) ABSTRACT

A backscatter tag system including a tag having tag circuitry and a reader for transmitting a command signal to the tag includes an energizer node for transmitting an energy signal to the tag to energize the tag and provide energy for operating the tag circuitry and for emitting a backscatter signal by the tag. The energizer node includes an energizer receiver for receiving the command signal from the reader to provide a received command signal and an energizer transmitter for transmitting the received command signal from the reader to the tag. The energizer node transmits both the energy signal and the received command signal to the tag. The energizer transmitter can transmit a sinusoidal signal, a frequency hopping signal, a spread spectrum signal, or a frequency shifted signal to the tag. The backscatter tag circuitry can include a processor.

23 Claims, 1 Drawing Sheet

(56) References Cited

U.S. PATENT DOCUMENTS

| | | | |
|---|---|---|---|
| 6,252,542 B1 | 6/2001 | Sikina et al. | |
| 6,404,339 B1 * | 6/2002 | Eberhardt | 340/572.1 |
| 6,411,213 B1 * | 6/2002 | Vega et al. | 340/573.3 |
| 6,580,978 B1 | 6/2003 | McTamaney | |
| 6,600,420 B2 | 7/2003 | Goff et al. | |
| 6,660,418 B1 | 12/2003 | Tinker et al. | |
| 6,839,539 B2 | 1/2005 | Durrant et al. | |
| 7,018,361 B2 | 3/2006 | Gillespie, Jr. et al. | |
| 7,176,784 B2 * | 2/2007 | Gilbert et al. | 340/10.34 |
| 7,345,625 B1 | 3/2008 | Urkowitz | |
| 7,348,884 B2 | 3/2008 | Higham | |
| 7,362,266 B2 | 4/2008 | Collinson | |
| 7,446,646 B2 * | 11/2008 | Huomo | 340/10.1 |
| 7,549,579 B2 * | 6/2009 | Overhultz et al. | 235/383 |
| 7,551,070 B2 | 6/2009 | Talty et al. | |
| 7,606,530 B1 * | 10/2009 | Anderson et al. | 455/7 |
| 7,741,970 B2 * | 6/2010 | Cunningham et al. | 340/572.1 |
| 7,872,581 B2 * | 1/2011 | Darianian et al. | 340/572.1 |
| 8,198,985 B2 * | 6/2012 | Tiernay et al. | 340/10.51 |
| 8,618,916 B2 * | 12/2013 | Gravelle et al. | 340/10.51 |
| 8,633,821 B2 * | 1/2014 | Forster | 340/572.1 |
| 2002/0021208 A1 | 2/2002 | Nicholson et al. | |
| 2005/0150949 A1 | 7/2005 | Goel et al. | |
| 2006/0114102 A1 | 6/2006 | Chang et al. | |
| 2006/0145815 A1 * | 7/2006 | Lanzieri et al. | 340/10.2 |
| 2007/0008150 A1 * | 1/2007 | Hassell | 340/573.1 |
| 2007/0040025 A1 * | 2/2007 | Goel et al. | 235/383 |
| 2007/0080804 A1 | 4/2007 | Hirahara et al. | |
| 2007/0120683 A1 | 5/2007 | Flippen et al. | |
| 2007/0224938 A1 | 9/2007 | Jung et al. | |
| 2008/0082360 A1 | 4/2008 | Bailey et al. | |
| 2008/0157968 A1 | 7/2008 | Cunningham et al. | |
| 2009/0096413 A1 | 4/2009 | Partovi et al. | |

* cited by examiner

RFID REPEATER FOR RANGE EXTENSION IN MODULATED BACKSCATTER SYSTEMS

CROSS-REFERENCE TO RELATED APPLICATIONS

This utility application claims the benefit under 35 U.S.C. §119(e) of Provisional Application Ser. No. 61/190,791 filed on Sep. 3, 2008 entitled RFID REPEATER FOR RANGE EXTENSION IN MODULATED BACKSCATTER SYSTEM and whose entire disclosure is incorporated by reference.

BACKGROUND OF THE INVENTION

1. Field of Invention

This invention relates to the field of backscatter tags and, in particular, to systems for communicating with backscatter tags.

2. Description of Related Art

In RFID systems using modulated backscatter, a reader transmits a radio frequency (RF) signal, and the tags electronically reflect the RF signal. Batteryless or passive tags draw the energy required to run their circuitry from the received RF signal from the reader, while battery assisted or semipassive tags can use a battery to energize their circuitry. For passive tags, where the tag is powered by the signal emitted by the reader, the downlink from the reader to the tag is typically the bottleneck in the link budget, because of the received power threshold required to power up the tag. By using a battery to provide power to the tag's circuitry, semipassive tags relieve this downlink bottleneck, thus producing a significant increase in range. A modulated backscatter system may use either passive or semipassive tags, or a combination thereof.

In either case, in a modulated backscatter based RFID system, the tags electronically reflect the signal received from the reader, while modulating the backscattered signal with data stored in the tags. In addition, the tags may shift the frequency of the reflected signal, in order to separate the modulated backscatter from any unmodulated reflections of the reader signal from other scatterers. Additionally, readers at one stage of a business process may write new data onto tags, and the new data may be read by readers at later stages in the business process.

The downlink from reader to tag is often the bottleneck in RFID systems. Therefore, for passive tags, the received signal must be strong enough to energize the tag. Semipassive tags (or passive tags which can store energy for extended periods) may not use the received signal from the reader to energize the tag receiver circuitry. However, for standard RFID protocols in which tags only perform modulated backscatter when commanded to do so by the reader, the received signal strength must still exceed the threshold required for reliable demodulation of the reader's commands.

There are many situations where it is difficult for the received signal strength to exceed the threshold required for reliable demodulation of the reader's commands in conventional RFID systems. For example, it is difficult in short-range applications where the presence of moisture (e.g., for produce in cold chain applications), liquids (e.g., for pharmaceutical applications) or metal (e.g., in warehouse applications) impair the link. It is also difficult in long-range outdoor applications (e.g., location and tracking of trailers in a yard, or cars in an automobile dealership).

Many existing RFID communication protocols can only support one tag communicating with the reader at a time. Simultaneous transmissions from multiple tags within communication range of a reader typically lead to collisions of the backscattered signals. The collisions must be resolved using collision resolution algorithms or multiple access algorithms whose typical objective is to ensure that tags ultimately transmit one at a time to the reader. The range for RFID systems using passive tags is typically determined by the downlink from reader to tag, which is responsible for energizing the tag.

However, when using passive tags which can store either RF energy or energy gathered from other sources, the downlink signal from the reader may not be the only source for powering the tag during reader-tag communication. In this case, the bottleneck in the communication system may become the uplink. The link budget of the uplink must account for the round-trip propagation loss from the reader to the tag and back. In free space, this loss is proportional to $1/R^4$, where R denotes the range between the reader and the tag. Similarly, for semipassive tags, the uplink can become the bottleneck, since the downlink link budget only needs to be such that the tag circuitry can detect the reader signal, and the tags do not need to be powered.

Broadly, it is known to transfer power in inductive systems. For example, U.S. Patent Pub. No. 2009/0096413 A1, filed on May 7, 2008 by Partovi, discloses a system for variable power transfer in an inductive charging system. In the Partovi system, multiple receiver/energizer coils are used to recharge tags, mobile phones, MP3 players, radios and other types of portable devices. Additionally, an RFID reader detects the RFID tags in a conventional manner. However, Partovi does not disclose the dual use of an energizer as repeater.

U.S. Patent Pub. No. 2008/0082360 A1, filed on Sep. 27, 2007 by Bailey, discloses an inventory monitoring and control system wherein the weights of items before and after dispensing are measured in order to determine the amount of product inventory that has been dispensed. In the system taught by Bailey, an energizer coil energizes RFID tags which are later read by a reader. However, the Bailey energizer coil does not also operate as a repeater.

U.S. Patent Pub. No. 2007/0224938 A1, filed on Apr. 28, 2006 by Jung, teaches a vehicle control system with a reader/energizer which includes an energizer, a demodulator, and decoder circuits for energizing and reading an RFID tag.

Additionally, US Patent Pub. No. 2007/0120683 A1, filed on Nov. 25, 2005 by Flippen, teaches an implantable electronic medical device. In the implantable device disclosed by Flippen, a transponder in the implantable electronic medical device includes an induction circuit. The induction circuit is energized by a remote hand held reader. Thus, the implantable device taught by Flippen may be both energized and read by a reader/energizer device.

U.S. Pat. No. 4,333,072, issued to Beigel, describes an inductively coupled RFID system in which power to an RFID tag is derived from an alternating magnetic field. The magnetic field originates in a reader/energizer coupled inductively to the tag antenna, and rectified by a rectifier in the antenna. The resulting DC charge stored in a capacitor in the tag.

U.S. Pat. No. 7,551,070, filed on Aug. 31, 2006 by Talty, discloses a wireless sensing system including plural energizers in a predetermined area. The energizers transmit FR energy to tags in order to recharge them. Additionally, an energizer/reader interrogates the tags. U.S. Pat. Nos. 6,172,609, 7,018,361 and 7,348,884, also teach prior art energizer/readers.

However, none of the foregoing references disclose a tag system in which an energizer can also serve as a repeater.

All references cited herein are incorporated herein by reference in their entireties.

SUMMARY OF THE INVENTION

A backscatter tag system including at least one tag having tag circuitry and a reader for transmitting a command signal to the at least one tag includes an energizer node for transmitting an energy signal to the at least one tag to energize the at least one tag and provide energy for operating the tag circuitry and for emitting a backscatter signal by the at least one tag. The energizer node includes an energizer receiver for receiving the command signal from the reader in order to provide a received command signal and an energizer transmitter in order to transmit the received command signal from the reader to the at least one tag. The energizer node transmits both the energy signal and the received command signal to the at least one tag. The energizer transmitter can transmit a sinusoidal signal, a frequency hopping signal, a spread spectrum signal, or a frequency shifted signal to the at least one tag. The backscatter tag circuitry can include a processor.

The at lease one tag can operate in an open loop mode emitting a backscatter signal independently of the command signal from the reader. The at lease one tag can operate in a closed loop mode emitting a backscatter signal in accordance with the command from the reader. The at lease one tag can respond to the reader in accordance with a predetermined reader protocol. The energizer receiver and the energizer transmitter can operate in differing frequency bands. The energizer node can include a battery.

The backscatter tag system can include a plurality of backscatter signals having deterministic intervals between the backscatter signals. The backscatter tag system can include a plurality of backscatter signals having random intervals between the backscatter signals. The at least one tag can be a multimode tag and the multimode tag can change from one mode to another mode in accordance with the command signal from the reader. The command signal from the reader for the multimode tag to change from one mode to another can be transmitted from the reader to the multimode tag by way of the energizer node. The command signal from the reader can be a command for the multimode tag to change its frequency of operation. The at least one node can include an on mode and an off mode, and the command signal from the reader can include a command for the multimode tag to turn off.

The backscatter tag system can include a plurality of tags and a plurality of energizer nodes operating at respective energizer node frequencies wherein the reader synchronizes the frequencies of the respective energizer node frequencies in order to control interference of tags of the plurality of tags. The backscatter tag system can include a plurality of tags and a plurality of energizer nodes having respective energizer node timing wherein the reader synchronizes the timing of the energizer nodes of the plurality of energizer nodes in order to control interference of tags of the plurality of tags.

The range of RFID systems using modulated backscatter is often limited by the downlink from reader the to the tag, either because it is necessary for the reader to energize the tags or because the tag must be able to decode the commands from the reader before responding. The invention includes methods for overcoming this downlink bottleneck, and hence extending the range of operation, for such systems. In the open loop approach, the tag can operate in addition to, or as an alternative to, standard operation. When a tag operates in this mode, it can use modulated backscatter intermittently without the necessity of decoding explicit commands from the reader The radio frequency (RF) signal to be backscattered may come from a conventional reader, or it may come from an energizer node with functionality that can be substantially simpler than the functionality of a reader. Energizer nodes may broadcast sinusoidal tones, possibly hopping in frequency, in order to energize the tags. An energizer used in this manner can also be called an exciter. The tag may draw energy for operating its circuitry from the RF signals emitted by readers or energizer nodes, and/or a battery, and the tags may or may not have the capability for storing energy drawn from received RF signals. The circuitry in the tags energized by such energizer nodes can be any kinds of tag circuitry known to those skilled in the art.

The intervals between modulated backscatter signals may be deterministic or (pseudo) random, wherein random spacing between modulated backscatter signals can reduce the collisions between multiple tags that can occur when tags operate in an open loop mode. The tags may also use spread spectrum techniques, such as direct sequence or frequency hopping, while backscattering, in order to enhance multiple access and/or increase range of the system.

A tag may be a multi mode tag. An example of a multi mode tag is a tag that can switch between a standard mode, in which it is responsive to reader commands in accordance with a protocol, and an open loop mode. For example, an open loop mode may be initiated when the link budget is not sufficient to operate a standard protocol. In a closed loop approach, the energizer nodes can receive signals from a reader over one frequency band and retransmit the signals over another frequency band, such as an RFID band. Thus, an energizer can operate as a repeater for repeating reader signals, while also operating as an energizer or exciter for energizing the tags. Such a dual purpose energizer can also be referred to as an energizer/repeater or an exciter/repeater. Once a signal is transmitted by an energizer/repeater, the energizer/repeater can continue to transmit a sine wave, in order to keep the tag powered. The backscatter signals from the tag can be decoded by the reader.

DETAILED DESCRIPTION OF THE INVENTION

Figure 1:
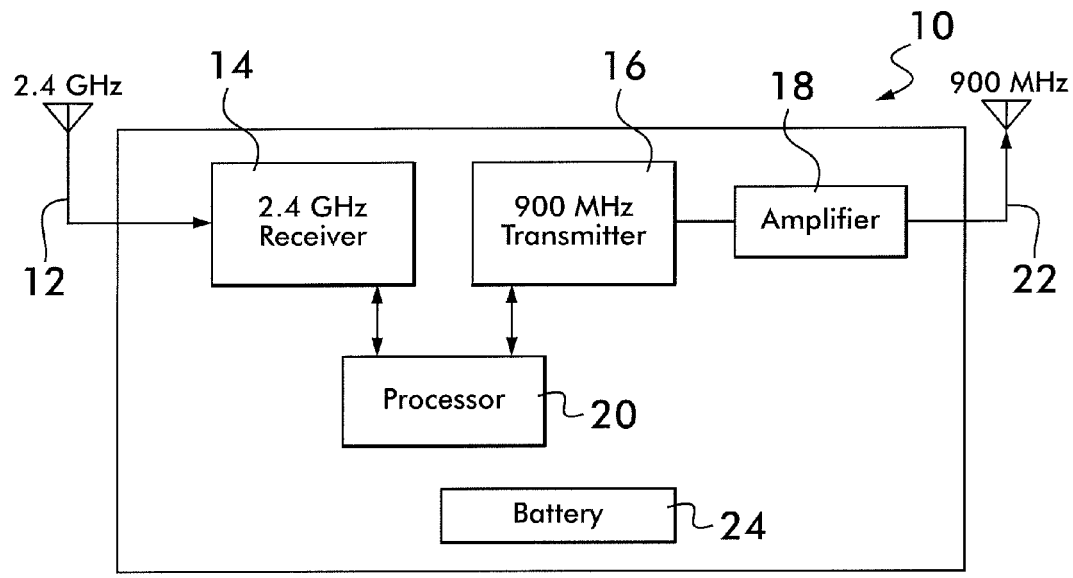
FIG. 1 shows a closed loop energizer node architecture suitable for use with the system and method of the invention.

Open Loop Mode for Modulated Backscatter from a Tag

Tags may operate in an open loop mode, without needing to decode commands for a reader. At intermittent times, a tag can broadcast its information, such as its identity, the readings of sensors attached to it, or other relevant information, by performing modulated backscatter, for example by switching the impedance of its transmit antenna. The times between the backscatter events may be chosen based on a backscatter event timer, and the tag circuitry (or rather, the bulk of the tag circuitry) may be put to sleep between successive backscatter events. The times between backscatter events may be equal, or may be chosen to be random.

In one embodiment, the tag does not need to be aware of whether there is an RF signal impinging on it. If there is no RF signal impinging on the tag, the backscatter event may not lead to the emission of an RF signal from the tag. The tag could simply switch its impedance in order to attempt modulated backscatter based on its backscatter event timer, with its success depending on whether or not there is actually an RF signal impinging on it. In another embodiment, after the expiration of the backscatter event timer, the tag receiver circuitry may try to detect the presence of an RF signal before attempting modulated backscatter. In this case, if no RF signal is detected, then the tag may go back to sleep after resetting the backscatter event timer.

Multi-Mode Tag Operation

A tag may operate in multiple modes, depending on its operating environment, or on commands from the reader, wherein instructions from the reader to the tag to alter its mode of operation can be transmitted directly from the reader to the tag, or from the reader to the tag by way of the energizer/repeater node. For example, a tag may implement conventional RFID protocols relying on bidirectional communication with the reader if it can demodulate signals from a reader. However, if it does not hear a signal from a reader then it can operate in the open loop mode described above. This may happen even when there is a reader transmitting nearby, if the received signal strength from the reader does not exceed the threshold required for the tag to decode the commands transmitted by the reader.

When bidirectional communication with the reader is feasible, the reader may reprogram the tag to change its mode of operation. For example, the reader may switch an open loop mode on or off, in order to permit operation in either open or closed loop modes. Additionally, the reader may change the characteristics of the backscatter event timer. For example, it may increase or decrease the average time between backscatter events, or switch it from constant time intervals to variable or random time intervals.

Tag Multiple Access in Frequency

In addition to modulating its data on a backscatter signal, a tag implementing modulated backscatter may also implement a frequency shift of the RF signal impinging on it. This can be accomplished, for example, by multiplying the baseband data being backscattered by a more rapidly varying square wave whose frequency equals the desired frequency shift. In the open loop mode, a tag may choose the frequency shift randomly. For example, it may use a pseudorandom number generator, or a deterministic function of its ID or data. This reduces the probability of collision between backscattered signals from multiple tags, which is especially useful when tags are operating in open loop mode (in which case mediation by the reader cannot be used to achieve collision resolution). The frequency shifts implemented by a tag may vary over different backscatter events for the tag. The frequency shift may also vary over the duration of a single backscatter event to implement a frequency hopped system. In an alternate embodiment, the frequency shifts can be controlled by the reader, either directly or by way of an energizer/repeater node.

Energizer Nodes—Open Loop

In addition to the use of full-fledged readers, the operation of tags in the open loop mode can be supported or controlled by the simpler energizer nodes. The simpler energizer nodes can provide an RF signal which energizes tags within its range. Such energizer nodes may simply emit unmodulated sinusoidal carriers for energizing tags, possibly signals hopping in frequency to provide robustness against fading, and to comply with regulatory guidelines for spectrum usage. Given the vastly simpler functionality of energizer nodes, they are can cost significantly less than a conventional reader. Under these circumstances, energizer nodes can be deployed more densely than readers within tag communication systems. They can therefore be located closer to more tags than is possible using the more complicated and expensive readers. By deploying energizer nodes close to tags, the propagation loss from the energizer nodes to the tags can be made smaller, thereby significantly enhancing the overall link budget of the system.

The backscattered signals from the tags energized by energizer nodes can be demodulated by reader nodes or by appliqués added to or coupled to a tag system. Energizer nodes may or may not have some or all appliqué or reader functionality incorporated in them. If multiple uncoordinated energizer nodes are in operation at the same time, a tag performing modulated backscatter may reflect backscattered signals at multiple frequencies. A receiver receiving the backscattered signals can combine the signals at different frequencies to obtain more reliable estimates of the stored data that is transmitted by the tags.

Energizer nodes can be coordinated by a more capable node, such as a reader node. For example, a reader may command the energizer nodes to turn on or off. It may be advantageous, for instance, to turn off an energizer node if a conventional RFID protocol is in operation, to avoid interference at the tag and reader receivers. Alternatively, the reader may direct energizer nodes to operate at different frequencies by assigning them different hopping patterns. A low cost means of communication between a conventional reader and an energizer is to attach a tag to the energizer node, or to incorporate tag functionality into the energizer node. A conventional reader can then control the energizer node by leveraging the commands provided in a conventional RFID protocol.

Reader to energizer node communication may also be used to synchronize the energizer nodes. For example, a reader may command a group of energizer nodes to start transmitting at a certain frequency, in a certain frequency hopping pattern, at a certain time. The signals from energizer nodes synchronized in this manner can interfere constructively or destructively at different times at different tags. However, the net carrier signal produced in this manner can be stronger in average power than the signal produced by a single energizer node.

Energizer Nodes—Closed Loop

In closed loop operation, the tags can wait for commands from the reader before responding with a backscatter signal. However, the energizer node concept that can be used in the open loop operation can still be used in closed loop operation. In closed loop operation the energizer can receive the reader commands and retransmit the reader commands to the tag. In order to achieve this repeater functionality, a reader to repeater/exciter communications control band, separate from the band of the reader, can be used. For example, the 2.4 GHz band or other band can be used for the reader to repeater/exciter communications control band. The commands can then be rebroadcast, for example, on the RFID band. A block diagram of a possible embodiment of a closed loop energizer/repeater node architecture 10 is shown in FIG. 1.

The closed loop energizer/repeater node architecture 10 shown in FIG. 1 includes a 2.4 GHz antenna 12 for receiving a reader control signal from a reader or another energizer or energizer/repeater node. The antenna 12 in the closed loop energizer/repeater node architecture 10 can apply the signal received from the reader to a 2.4 GHz receiver 14. The signal from the receiver 14 can be applied to the processor 20 of the energizer/repeater node architecture 10 for processing. The signal from the processor 20 can be applied to a 900 MHz transmitter 16 or to another type of transmitter. The processor 20 can thus provide a signal for retransmission by the energizer/repeater node architecture 10, as well as an energizing signal. The output of the 900 MHz transmitter 16 is amplified by an amplifier 18. The output of the amplifier 18 can be retransmitted to a tag by a 900 MHz antenna 22. A battery 24 is optional within the energizer/repeater node architecture 10.

Figure 2:
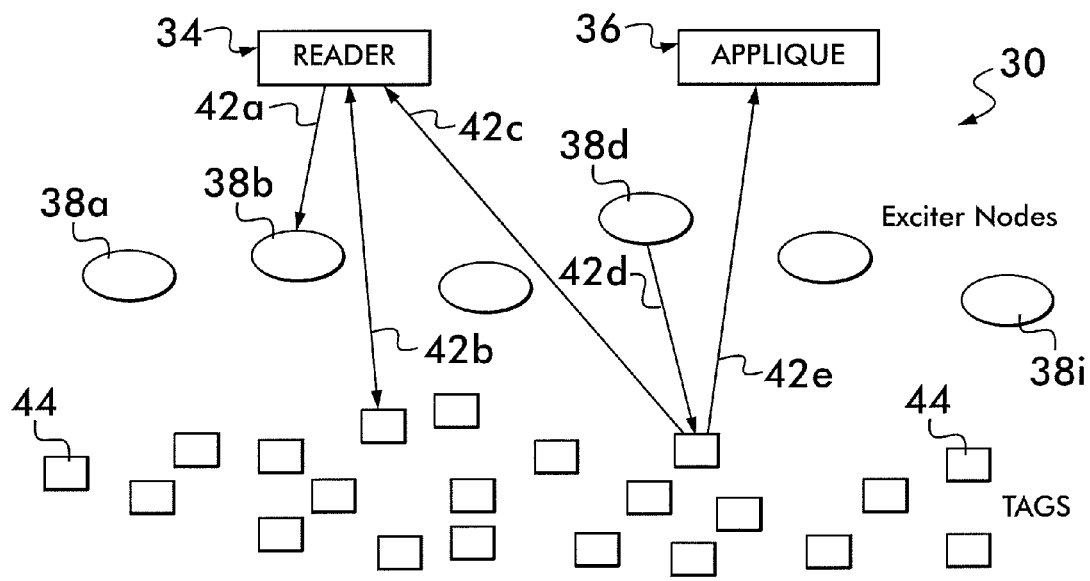
FIG. 2 shows a multi energizer node architecture including a plurality of energizer nodes suitable for use with the system and method of the invention.

FIG. 2 shows a block diagram representation of a multi energizer node system architecture 30. The multi energizer node system architecture 30 can include a reader 34 and an appliqué 36, the energizer nodes 38*a-i* or exciter nodes 38*a-i*, and any number of tags 44, in keeping with the system and method of the present invention. It will be understood that the multi energizer node system architecture 30 can include any number of readers 34 or appliqués 36, although only one of each are shown in the drawing for simplicity.

Additionally, the system architecture 30 can include any number of energizer nodes 38*a-i*, any number of tags 44, or any other devices known by those skilled in the art of tag backscatter communication systems. Any number of the energizer nodes 38*a-i* can be substantially similar to the closed loop energizer/repeater node architecture 10. Any of the remaining nodes 38*i-n* can be any other types of energizer node architectures or exciter node architectures known to those skilled in the art. While the energizer nodes 38*a-i* are located close to the population of tags 44 in a preferred embodiment of the multi energizer node system architecture 30, the elements of the system architecture 30 can be arranged in any locations that are convenient.

The tags 44 can reflect the signals emitted by the energizer nodes 38*a-i* when the multi energizer node system architecture 30 operates in the open loop mode. For example, the sinusoid transmitted from the exciter node 38*d* by way of the signal path 42*d* can be reflected as a modulated backscatter signal by a tag 44 by way of the signal paths 42*c,e* to the reader 34 or appliqué 36. Additionally, the devices 34, 36 can communicate directly with the tags 44, for example as shown by the signal path 42*b*, rather than by way of an energizer/repeater node 38*a-i*.

The modulated backscatter signals transmitted by the tags 44 in this manner can be demodulated by the reader 34 or appliqué 36, or by any other reader nodes or appliqué nodes. Furthermore, the demodulated signals may be used to estimate the locations of the tags 44, as well as to obtain information such as the identifications of the tags 44 and the states of any assets that may be attached to the tags 44. For example, the information contained in the modulated backscattered signals from the tags 44 can include the readout from a temperature sensor, such as a temperature sensor in cold chain applications. In another embodiment, the information in the modulated backscattered signal can represent the status of a part in a manufacturing application.

Direct Sequence Spread Spectrum

The modulated backscattered signal transmitted by a tag 44 in the system architecture 30 can be a symbol sequence selected to have good autocorrelation properties, i.e., to have small normalized correlation with shifts of itself. Additionally, symbol sequences sent by different tags 44 in the system architecture 30 can be chosen to have good cross correlation properties with each other, i.e., to have small normalized correlations with each other.

The tag identification numbers of the tags 44 may be encoded in the symbol sequence in any way known to those skilled in the art. For example, the symbol sequence may be chosen to take the form of a direct sequence spread spectrum waveform, in which a chip sequence, or spreading sequence, with good autocorrelation and cross correlation properties, is modulated at a slower rate by a data sequence which caries information. The tag identification, as well as other information to be sent from a tag 44 to a reader such as the reader 34, may be encoded in the choice of the spreading sequence. Alternately, it may be encoded in the data modulating, in the spreading sequence, or in a combination thereof.

If the period of the spreading sequence of the backscatter signal coincides with the span of a data symbol, then it is termed a short spreading sequence. If the spreading sequence is aperiodic, or has a period significantly larger than the span of a data symbol, then it is termed a long spreading sequence. The number of symbols, or chips, corresponding to the span of a single data symbol, is termed the processing gain.

Range Extension

A reader node 34 or an appliqué node 36 can correlate the signal received from a tag 44 against the spreading sequences that can possibly be used by the tags 44 within the system architecture 30. Integration over the spreading sequence increases the signal-to-noise ratio of the received signals, and enhances the reliability of data demodulation. Thus, by choosing the processing gain to be long enough, it is possible to enhance the range of reliable communication between readers and tags. For example, a processing gain of 256 can yield a four-fold increase in the range R, assuming a propagation loss of $1/R^4$. It can yield and a sixteen-fold increase in range assuming a propagation loss of $1/R^2$.

Code Division Multiple Access (CDMA)

The use of spread spectrum may also permit multiple tags 44 to communicate reliably with the reader 34 at the time, thus constituting a code division multiple access (CDMA) system. In this case, the reader 34 is equipped with a receiver capable of decoding multiple tags 44, using standard CDMA reception techniques. One standard CDMA technique includes correlating a received signal against the possible spreading sequences of all of the tags 44 being demodulated within the system architecture 30. The outputs of the correlators can have some residual interference because of the cross correlation between the different spreading sequences. However, the interference between the signals is small for well-designed spreading sequences, and a CDMA system architecture 30 may provide adequate performance even when the receivers of the reader 34 ignore the structure of the multiple-access interference due to multiple tags 44.

However, it is also possible to use multiuser detection techniques that exploit the interference structure. These include but are not limited to linear decorrelation, interference cancellation, and maximum likelihood techniques. For short spreading sequences, the interference can have a cyclostationary structure, which can be exploited by adaptive multiuser detection or interference suppression techniques. These techniques can include but are not limited to Linear Minimum Mean Squared Error (LMMSE) and decision feedback receivers, which can be adapted using algorithms such as Least Mean Squares (LMS), Recursive Least Squares (RLS), or block least squares. If the receiver has multiple antenna arrays, then multiuser detection can be performed using spatiotemporal processing, for example, by using LMMSE-based correlation for a block of samples for all antennas corresponding to a given time interval.

Tag Multiple Access in Open Loop Mode

Conventional RFID protocols within system architectures such as the system architecture 30 can have collision resolution protocols based on bidirectional communication between readers 34 and tags 44. For open loop operation of the tags 44, however, multiple access can be achieved by techniques such as time division, frequency division, or code division, and any combinations thereof. Time division may be achieved by appropriately randomizing the times between backscatter events. Frequency division is achieved by tags 44 randomly choosing a frequency offset when backscattering.

Code division can be achieved by frequency hopping methods, by direct sequence spreading methods, or by any other methods known in the art.

Multiple access and range extension within the system architecture 30 can be further enhanced through a mapping between tag Electronic Product Code (EPC) codes. The mapping can be dynamic. Multiple access and range extension can also be enhanced by "good minimum distance" codeword sequences (ID's) that are derived from an appropriate Forward Error Correction (FEC) code. For example, for a 64-bit EPC tag there can be about 1000 tags in a spatial region that need to be identified (spatial reuse of code sequences is also possible). The large ratio of possible 64-bit sequences to possible number of tags (1000) allows the possibility of assigning appropriate sequences to the tags that are spaced "far apart" to provide maximal immunity to physical or synchronization-related noise. In coding theory terminology, this affords a low-rate (n,k) code, in the above illustration a (64, 10) code. The coding gain due to this can add to the performance gains due to CDMA processing, for example.

While the invention has been described in detail and with reference to specific examples thereof, it will be apparent to one skilled in the art that various changes and modifications can be made therein without departing from the spirit and scope thereof.

What is claimed is:

1. A backscatter tag system, comprising:
   a reader for transmitting signals, wherein the transmitted signals include a command signal and an energy signal;
   at least one tag having a tag circuitry, wherein the at least one tag is a multimode tag configured to operate (1) in a closed loop mode when the at least one tag detects and demodulates the transmitted signals, or (2) in an open loop mode when the at least one tag fails to detect the transmitted signals within a predefined time period; and
   an energizer node:
      receiving the energy signal from the reader and transmitting the energy signal to the at least one tag; and
      receiving the command signal from the reader, wherein the energizer node performs a predefined function based on content of the received command signal.

2. The backscatter tag system of claim 1, wherein the energizer node transmits a sinusoidal signal to the at least one tag.

3. The backscatter tag system of claim 1, wherein the energizer node transmits a frequency hopping signal to the at least one tag.

4. The backscatter tag system of claim 1, wherein the energizer node transmits a spread spectrum signal to the at least one tag.

5. The backscatter tag system of claim 1, wherein the energizer node transmits a frequency shifted signal to the at least one tag.

6. The backscatter tag system of claim 1, wherein the at least one tag operates in an open loop mode emitting a backscatter signal independently of the command signal from the reader.

7. The backscatter tag system of claim 1, wherein the at least one tag operates in a closed loop mode emitting a backscatter signal in accordance with the command signal from the reader.

8. The backscatter tag system of claim 7, wherein the at least one tag responds to the reader in accordance with a predetermined reader protocol.

9. The backscatter tag system of claim 1, wherein the energizer node comprises a battery.

10. The backscatter tag system of claim 1, including a plurality of backscatter signals further comprising deterministic intervals between the backscatter signals of the plurality of backscatter signals.

11. The backscatter tag system of claim 1, including a plurality of backscatter signals further comprising random intervals between the backscatter signals of the plurality of backscatter signals.

12. The backscatter tag system of claim 1, wherein the command signal from the reader is transmitted from the reader to a multimode tag by way of the energizer node.

13. The backscatter tag system of claim 12, wherein the command signal from the reader comprises a command for the multimode tag to change its frequency of operation.

14. The backscatter tag system of claim 1, further comprising a plurality of tags and a plurality of energizer nodes having respective energizer node timing wherein the reader synchronizes the timing of the energizer nodes of the plurality of energizer nodes in order to control interference of tags of the plurality of tags.

15. The backscatter tag system of claim 1, wherein the energizer node further comprises:
   a processor for providing a retransmission of the received command signal at a different frequency band; and
   an amplifier, coupled to said processor, for amplifying the retransmission of the command signal.

16. The backscatter tag system of claim 1, wherein the energizer node is configured to receive the command signal in a first frequency band and retransmit the received command signal in a second frequency band, the first frequency band and the second frequency band being different frequency bands.

17. The backscatter tag system of claim 1, wherein:
   the at least one tag receives the transmitted signals in accordance with a predefined protocol when the at least one tag operates in the closed loop mode, and
   the at least one tag receives the transmitted signals independent of a predefined protocol when the at least one tag operates in the open loop mode.

18. A method, comprising:
   transmitting signals, from a reader, wherein the transmitted signals include a command signal and an energy signal;
   providing an RFID tag, wherein the RFID tag is a multimode tag configured to operate (1) in a closed loop mode when the RFID tag detects and demodulates the transmitted signals, or (2) in an open loop mode when the RFID tag fails to detect the transmitted signals from the reader within a predefined time period;
   receiving, at an energizer node, the energy signal, and transmitting the received energizer signal from the energizer node to the RFID tag to energize the RFID tag; and
   receiving the command signal at the energizer node, wherein the energizer node performs a predefined function based on content of the received command signal.

19. The method of claim 18, wherein the energizer node transmits a sinusoidal signal to the RFID tag.

20. A backscatter tag system, comprising:
   a reader for transmitting signals, wherein the transmitted signals include a command signal and an energy signal;
   at least one tag having a tag circuitry, wherein the at least one tag is a multimode tag configured to operate in an open loop mode when the at least one tag detects the transmitted signals and determines that the transmitted signals do not exceed a predefined threshold for decoding the command signal; and
   an energizer node:

receiving the energy signal from the reader and transmitting the energy signal to the at least one tag; and receiving the command signal from the reader, wherein the energizer node performs a predefined function based on content of the received command signal.

21. The backscatter tag system of claim 20, wherein the energizer node transmits a sinusoidal signal to the at least one tag.

22. A method, comprising:

transmitting signals, from a reader, wherein the transmitted signals include a command signal and an energy signal;

providing an RFID tag, wherein the RFID tag is a multi-mode tag configured to operate in an open loop mode when the RFID tag detects the transmitted signals and determines that the transmitted signals do not exceed a predefined threshold for decoding the command signal;

receiving, at an energizer node, the energy signal, and transmitting the received energizer signal from the energizer node to the RFID tag to energize the RFID tag; and receiving the command signal at the energizer node, wherein the energizer node performs a predefined function based on content of the received command signal.

23. The method of claim 22, wherein the energizer node transmits a sinusoidal signal to the RFID tag.

* * * * *